United States Patent
Karlik et al.

(12) 
(10) Patent No.: US 6,504,002 B1
(45) Date of Patent: Jan. 7, 2003

(54) PROCESS FOR THE PRODUCTION OF BRANCHED MELT POLYCARBONATE BY LATE ADDITION OF FRIES-INDUCING CATALYST

(75) Inventors: Dennis Karlik, Bergen op Zoom (NL); Hans Peter Brack, Bergen op Zoom (NL); Hendrik Verhoogt, Bergen op Zoom (NL); John Patrick Lemmon, Delanson, NY (US); Jan Henk Kamps, Bergen op Zoom (NL); Willem Lodewijk Sederel, Kalmthout (BE); Johannes Martinus Dina Goossens, Bergen op Zoom (NL)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/683,410

(22) Filed: Dec. 21, 2001

(51) Int. Cl.[7] ................................................ C08G 64/02
(52) U.S. Cl. ...................................... 528/196; 528/198
(58) Field of Search ................................ 528/196, 198, 528/199, 200

(56) References Cited

U.S. PATENT DOCUMENTS

| | | | |
|---|---|---|---|
| 3,442,854 A | 5/1969 | Curtius et al. | |
| 5,026,817 A | 6/1991 | Sakashita et al. | |
| 5,097,002 A | 3/1992 | Sakashita et al. | |
| 5,142,018 A | 8/1992 | Sakashita et al. | |
| 5,151,491 A | 9/1992 | Sakashita et al. | |
| 5,340,905 A | 8/1994 | Kühling et al. | |
| 6,323,304 B1 | 11/2001 | Lemmon et al. | |

FOREIGN PATENT DOCUMENTS

DE     19727709     1/1999

*Primary Examiner*—Terressa M. Boykin
(74) *Attorney, Agent, or Firm*—Oppedahl & Larson LLP (57) ABSTRACT

The invention relates to a method for the production of a branched polycarbonate composition, having increased melt strength, by late addition of branch-inducing catalysts to the polycarbonate oligomer in a melt polycondensation process. Surprisingly, it has been found that by adding branch-inducing catalysts, such as alkali metal compounds and/ or alkaline earth metal compounds, to the melt polycarbonate oligomer at a later stage of the melt polycondensation process, preferably after the oligomer has reached an average molecular weight of between about 3,000 and 30,000 g/mole, a unique branched polycarbonate composition is formed that has improved properties. It is believed that the addition of the branch-inducing catalysts at the later stages of the process produces a branched polycarbonate composition having longer chains between the branching points, and thus a new composition is produced. The invention also relates to various applications of the branched polycarbonate composition.

89 Claims, 1 Drawing Sheet

PROCESS FOR THE PRODUCTION OF BRANCHED MELT POLYCARBONATE BY LATE ADDITION OF FRIES-INDUCING CATALYST

BACKGROUND OF INVENTION

The present invention relates to a method for production of a branched polycarbonate composition, having increased melt strength, by late addition of branch-inducing catalysts to the polycarbonate oligomer in a melt polycondensation process, the resulting branched polycarbonate composition, and various applications of the branched polycarbonate composition.

Polycarbonate has excellent mechanical properties, such as impact resistance and heat resistance, and also has excellent transparency. It is widely used in many engineering applications. In one typical method for producing a polycarbonate, an aromatic dihydroxy compound such as Bisphenol A (BPA) and a diarylcarbonate such as diphenylcarbonate (DPC) are reacted in an ester exchange method in a molten state. This is referred to as the melt-polycondensation process or transesterification process. The resulting polycarbonate may be extruded or otherwise processed, and may be combined with additives such as dyes and UV stabilizers.

In certain processes and applications, such as blow moulding of bottles and extrusion of sheet products, it is desirable to use a branched polycarbonate due to the higher melt strengths of the branched polycarbonates. One method for making branched polycarbonates with high melt strengths is a variation of the melt-polycondensation process where the diphenyl carbonate and Bisphenol A are polymerized together with polyfunctional alcohols or phenols as branching agents. DE 19727709 discloses a process to make branched polycarbonate in the melt-polymerization process using aliphatic alcohols. Because this process requires expensive additional raw materials, such as the polyfunctional alcohols or phenols, additional costs and complexities are added to the polycarbonate production process. Additionally, it should be noted that continuous reactor systems require long periods of time and generate substantial amounts of transition materials when changing from one polycarbonate composition to another.

It is known that alkali metal compounds and alkaline earth compounds, when used as catalysts added to the monomer stage of the melt process, will not only generate the desired polycarbonate compound, but also other products after a rearrangement reaction known as the "Fries" rearrangement. This is discussed in U.S. Pat. No. 6,323,304. The presence of the Fries rearrangement products in a certain range can increase the melt strength of the polycarbonate resin to make it suitable for bottle and sheet applications. This method of making a polycarbonate resin with a high melt strength has the advantage of having lower raw material costs compared with the method of making a branched polycarbonate by adding "branching agents." In general, these catalysts are less expensive and much lower amounts are required compared to the branching agents.

JP 09059371 discloses a method for producing an aromatic polycarbonate in the presence of a polycondensation catalyst, without the use of a branching agent, which results in a polycarbonate possessing a branched structure in a specific proportion. In particular, JP 09059371 discloses the fusion polycondensation reaction of a specific type of aromatic dihydroxy compound and diester carbonate in the presence of an alkali metal compound and/or alkaline earth metal compound and/or a nitrogen-containing basic compound to produce a polycarbonate having an intrinsic viscosity of at least 0.2. The polycarbonate is then subject to further reaction in a special self-cleaning style horizontal-type biaxial reactor having a specified range of the ratio L/D of 2 to 30 (where L is the length of the horizontal rotating axle and D is the rotational diameter of the stirring fan unit). JP 09059371 teaches the addition of the catalysts directly to the aromatic dihydroxy compound and diester carbonate monomers. Typically, much higher levels of catalysts need to be added to the monomers to produce adequate branching and melt strength for blow moulding than for the production of general purpose linear polycarbonate. Also, if the catalysts or catalyst levels in the monomer mix tank of a continuous reactor system are changed, long operating times are required for the transition from the stable operation to produce linear polycarbonate to that to produce branched polycarbonate. This long transition time also produces large quantities of ill-defined transition materials having variable levels of branching. These disadvantages can be rather costly, especially when production plants frequently change between producing linear and branched polycarbonate.

There is a need for an improved process, which has rapid transition times and produces limited transition materials, for the production of a branched polycarbonate having increased melt strength.

SUMMARY OF INVENTION

The invention relates to a method for the production of a branched polycarbonate composition, having increased melt strength, by late addition of branch-inducing catalysts to the polycarbonate oligomer in a melt polycondensation process. Applicants have surprisingly found that by adding branch-inducing catalysts, such as alkali metal compounds and/or alkaline earth metal compounds, to the melt polycarbonate oligomer at a later stage of the melt polycondensation process, preferably after the oligomer has reached a weight average molecular weight (Mw) of between 3,000 and 30,000 g/mole, a unique branched polycarbonate composition is formed that has improved properties. It is believed that the addition of the branch-inducing catalysts at the later stages of the process produces a branched polycarbonate composition having longer chains between the branching points and containing less insoluble and unmeltable gels in the resin product, and thus a new composition is produced. The invention also relates to various applications of the branched polycarbonate composition.

DETAILED DESCRIPTION

The invention relates to a process for the production of a branched polycarbonate composition, having increased melt strength, by late addition of branch-inducing catalysts to the polycarbonate oligomer during a melt polycondensation process after the polycarbonate oligomer has reached a weight average molecular weight (Mw) of at least 3,000 g/mole, for example, 4,000 g/mole or more. Applicants have found that by adding branch-inducing catalysts to the already-formed polycarbonate oligomer, which is suitable for the production of general purpose linear polycarbonate, a unique branched polycarbonate composition with a controlled build-up of the melt strength can be produced instead. It is believed that the addition of the branch-inducing catalysts at the later stages of the process produces a branched polycarbonate composition having longer chain lengths between the branching points and containing less insoluble and unmeltable gels in the resin product.

Another important advantage of the invention is that it allows for the ability to switch back and forth rapidly between campaigns of manufacturing low Fries resins (desirable for nearly all applications) to high Fries resins for only bottles and sheets. By adding the branch-inducing catalysts later in the process, it is possible to allow the initial reactors to run undisturbed at low Fries conditions and then only change the last reactor or two to change the type of product made.

Applicants have also found that it is preferable to add the branch-inducing catalysts to a polycarbonate oligomer having a molecular weight of less than about 30,000 g/mole. Applicants have found that the addition of branch-inducing catalysts to a polycarbonate oligomer having a molecular weight of greater than 30,000 g/mole provides little further increase in branched Fries products and melt strength.

Adding the branch-inducing catalysts to the already-formed polycarbonate oligomer having an average molecular weight of at least 3,000 g/mole is referred to as "late addition." The branched polycarbonate product is referred to hereinafter as the branched polycarbonate composition, the branched polycarbonate resin, the final resin, or the product.

Figure 1:
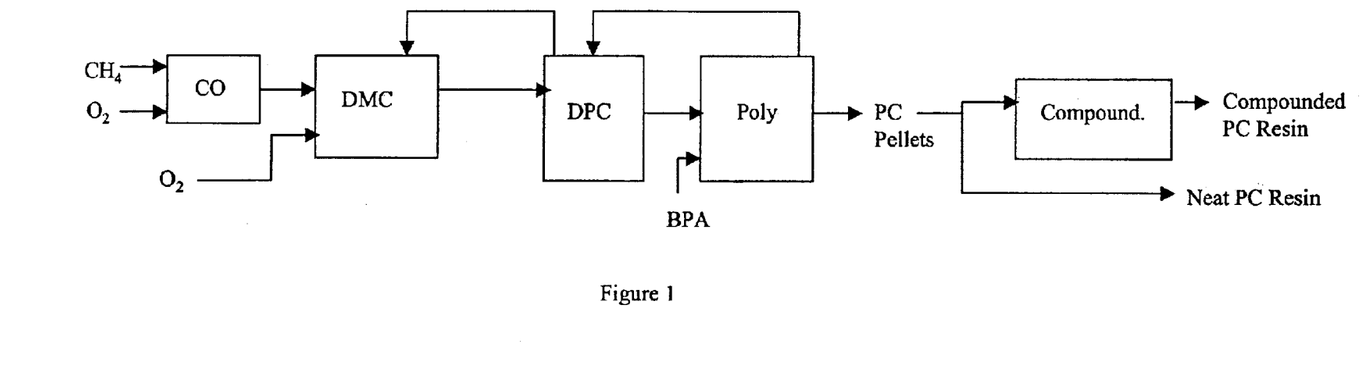
FIG. 1 illustrates a prior art melt polycondensation process for the production of polycarbonate.
Figure 2:
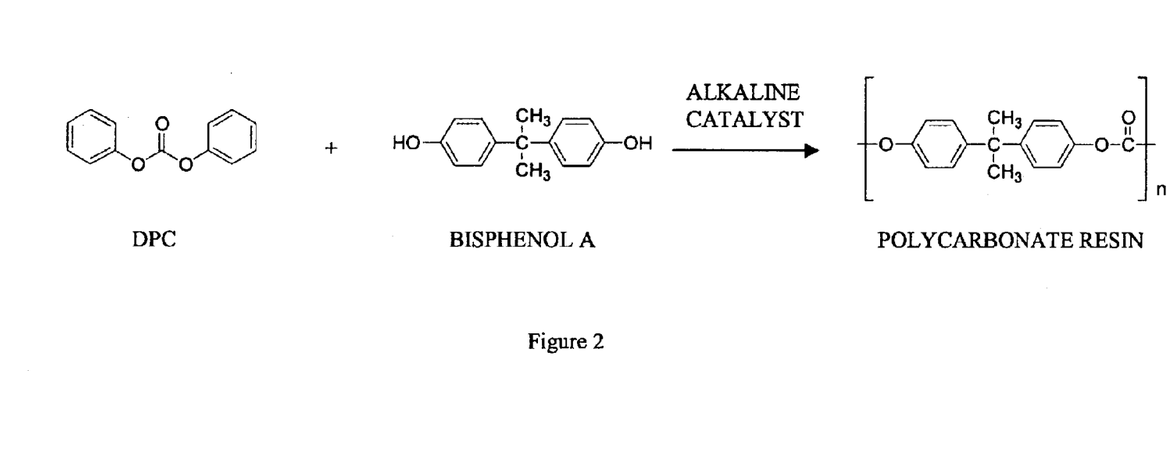
FIG. 2 illustrates the reaction scheme for a base-catalyzed melt polycondensation reaction of the prior art.

Method for Production of the Branched Polycarbonate Composition:

Melt Polycondensation Process: In the melt-polycondensation process (melt process) or transesterification process for producing a polycarbonate, an aromatic dihydroxy compound such as Bisphenol A (BPA) and a diarylcarbonate such as diphenylcarbonate (DPC) are reacted in an ester exchange method in a molten state. This melt process is represented in FIG. 1. This melt process makes use of a diarylcarbonate, such as diphenylcarbonate as an intermediate, which is polymerized with a dihydric phenol such as Bisphenol A in the presence of an alkaline catalyst to form a polycarbonate in accordance with the general reaction scheme shown in FIG. 2. The production of polycarbonates by transesterification is well-known in the art and described, for example, in Organic Polymer Chemistry by K. J. Saunders, 1973, Chapman and Hall Ltd., as well as in a number of U.S. patents, including U.S. Pat. Nos.: 3,442,854; 5,026,817; 5,097,002; 5,142,018; 5,151,491; and 5,340,905.

Branching can be induced in the polycarbonates by the addition of branch-inducing catalysts, such as alkali metal compounds and alkaline earth compounds in the melt process. The addition of these catalysts not only generates the linear polycarbonate compound A:

but also such products as B and C after a rearrangement reaction known as the "Fries" rearrangement:

"Linear Fries Products" (B)

"Branched or Extended Fries Products" (C)
wherein X represents, for example, one of the groups of formula:

wherein R1 and R2 each independently represent a hydrogen atom or a monovalent linear or cyclic hydrocarbon group and R3 is a divalent hydrocarbon group. The presence of products B and C, especially C, in a certain range can increase the melt strength of the polycarbonate resin to make it suitable for bottle and sheet applications. In some embodiments of the invention, the polycarbonate oligomers to which the branch-inducing catalysts are added have Fries branch point structures. The term "Fries branch point structures" refers to the points on the Fries rearrangement products from where three or more chains radiate.

In the present invention, one or more branch-inducing catalysts are added to a melt polycondensation or transesterification process. The reaction can be carried out by either a batch mode or a continuous mode. The apparatus in which the reaction is carried out can be any suitable vessel, such as a tank, tube, or column. The continuous processes usually involve the use of one or more Continuous-Flow Sterred Tank Reactors (CSTR's) and one or more finishing reactors.

Some non-limiting examples of the aromatic dihydroxy compounds include bis (hydroxyaryl)alkanes, such as bis(4-hydroxyphenyl)methane; 1,1-bis(4-hydroxyphenyl)ethane; 2,2-bis(4-hydroxyphenyl)propane (also known as Bisphenol A); 2,2-bis(4-hydroxyphenyl)butane; 2,2-bis(4-hydroxyphenyl)octane; bis(4-hydroxyphenyl) phenylmethane; 2,2-bis(4-hydroxy-1-methylphenyl) propane; 1,1-bis(4-hydroxy-t-butylphenyl)propane; and 2,2-bis(4-hydroxy-3-bromophenyl)propane, bis(hydroxyaryl) cycloalkanes, such as 1,1-(4-hydroxyphenyl)cyclopentane and 1,1-bis(4-hydroxyphenyl)cyclohexane, dihydroxyaryl ethers, such as 4,4'-dihydroxydiphenyl ether and 4,4'dihydroxy-3,3'-dimethylphenyl ether, dihydroxydiaryl sulfides, such as 4,4'-dihydroxydiphenyl sulfide and 4,4'-dihydroxy-3,3'-dimethyldiphenyl sulfide, dihydroxydiaryl sulfoxides, such as 4,4'-dihydroxydiphenyl sulfoxide and 4,4'-dihydroxy-3,3'-dimethyidiphenyl sulfoxide, and dihydroxydiaryl sulfones, such as 4,4'-dihydroxydiphenyl sulfone and 4,4'-dihydroxy-3,3'-dimethyldiphenyl sulfone. In an exemplary embodiment of the invention, the aromatic dihydroxy compound used is Bisphenol A (BPA).

Examples of the carbonic acid diesters include diphenyl carbonate, ditolyl carbonate, bis(methylsalicyl)carbonate, bis(ethylsalicyl)carbonate, bis(propylsalicyl)carbonate, bis(benzylsalicyl)carbonate, bis(phenylsalicyl)carbonate, bis(2-benzoylphenyl)carbonate, bis(chlorophenyl)carbonate, m-cresyl carbonate, and dinaphthyl carbonate. In an exemplary embodiment of the invention, diphenyl carbonate (DPC) is used.

In one aspect of the invention, the polymerization promoter is added together with DPC or another diaryl carbonate to form high levels of end-capped polycarbonate. Some non-limiting examples of polymerization promoters are represented by the formulas:

where $R_1$ is an electron withdrawing group such as carbonyl, alkoxylcarbonyl, nitro or chloro. Some non-limiting examples are: bis(methylsalicyl)carbonate, bis(ethylsalicyl)carbonate, bis(propylsalicyl)carbonate, bis(benzylsalicyl)carbonate, bis(phenylsalicyl)carbonate, and bis(2-benzoylphenyl)carbonate.

The carbonic diester component may also contain an amount (e.g., up to about 50 mole %) of a dicarboxylic acid or its ester, such as terephthalic acid or diphenyl isophthalate, to prepare polyester polycarbonates. In preparing the polycarbonates, usually about 1.0 mole to about 1.3 moles of carbonic diester are used for every 1 mole of the aromatic dihydroxy compound. In an exemplary embodiment, about 1.01 moles to about 1.20 moles of the carbonic diester is used.

Branch-Inducing Catalysts: The branch-inducing catalysts comprise alkali metal compounds and/or alkaline earth metal compounds. By way of example, the alkali metal compounds can be alkali metal salts with the formula:

$$(M^+)_n Y^{n-}$$

and the alkaline earth metal compounds can be alkaline earth metal salts with the formula:

$$(M^{2+})_n Y^{2n-}$$

Some non-limiting examples of the alkali metal compounds mentioned above are the hydroxides of the alkali metals, hydrocarbons of the alkali metals, carbonate salts of the alkali metals, acetic acid salts (acetates) of the alkali metals, aliphatic acid salts of the alkali metals, aromatic acid salts of the alkali metals, nitric acid salts (nitrates) of the alkali metals, nitrous acid salts (nitrites) of the alkali metals, sulfurous acid (sulfites) of the alkali metals, cyanic acid salts (cyanates) of the alkali metals, thiocyanic acid salts (thiocyanates) of the alkali metals, styrinic acid salts (styrinates) of the alkali metals, boron hydrogen salts (borohydrides) of the alkali metals, benzoic acid salts (benzoates) of the alkali metals, phosphoric acid hydrogen salts (hydrogen phosphates) of the alkali metals, vanadium oxoanion salts of the alkali metals, bisphenol salts of the alkali metals, and phenol salts of the alkali metals. By way of more specific, but non-limiting example, sodium hydroxide, potassium hydroxide, lithium hydroxide, sodium hydrogen carbonate, potassium hydrogen carbonate, lithium hydrogen carbonate, carbonic acid sodium (sodium carbonate), carbonic acid potassium (potassium carbonate), carbonic acid lithium (lithium carbonate), sebaccic acid disodium salt, 2,2'-biquinoline-4,4'dicarboxylicacid disodium salt, 1,2-bis(2-aminiphenoxy)-ethane-N,N,N',N'-tetra acetic acid tetracesium salt, nitric acid sodium (sodium nitrate), nitric acid potassium (potassium nitrate), nitric acid lithium (lithium nitrate), nitrous acid sodium (sodium nitrite), nitrous acid potassium (potassium nitrite), nitrous acid lithium (lithium nitrite), cyanic acid sodium (sodium cyanate), cyanic acid potassium (potassium cyanate), cyanic acid lithium (lithium cyanate), thiocyanic acid sodium (sodium thiocyanate), thiocyanic acid potassium (potassium thiocyanate), thiocyanic acid lithium (lithium thiocyanate), styrinic acid sodium (sodium styrinate), styrinic acid potassium (potassium styrinate), styrinic acid lithium (lithium styrinate), hydrogenated boron sodium (sodium hydroboron), hydrogenated boron potassium (potassium hydroboron), hydrogenated boron lithium (lithium hydroboron), phenylated boron sodium (sodium phenylboron), benzoic acid sodium (sodium benzoate), benzoic acid potassium (potassium benzoate), benzoic acid lithium (lithium benzoate), phosphoric acid hydrogen disodium (disodium hydrogen phosphate), phosphoric acid hydrogen dipotassium (dipotassium hydrogen phosphate), phosphoric acid hydrogen dilithium (dilithium hydrogen phosphate), sodium orthovanadate, disodium salt of Bisphenol A, dipotassium salt of Bisphenol A, dilithium salt of Bisphenol A, sodium salt of phenol, potassium salt of phenol, and lithium salt of phenol can be given.

Some non-limiting examples of the alkaline earth metal compounds mentioned above are the hydroxides of the alkaline earth metals, hydrocarbons of the alkaline earth metals, carbonate salts of the alkaline earth metals, acetic acid salts (acetates) of the alkaline earth metals, nitric acid salts (nitrates) of the alkaline earth metals, nitrous acid salts (nitrites) of the alkaline earth metals, sulfurous acid salts (sulfites) of the alkaline earth metals, cyanic acid salts (cyanates) of the alkaline earth metals, thiocyanic acid salts (thiocyanates) of the alkaline earth metals, styrinic acid salts (styrinates) of the alkaline earth metals, boron hydrogen salts (borohydrides) of the alkaline earth metals, benzoic acid salts (benzoates) of the alkaline earth metals, phosphoric acid hydrogen salts (hydrogen phosphates) of the alkaline earth metals, bisphenol salts of the alkaline earth metals, and phenol salts of the alkaline earth metals.

By way of more specific, but non-limiting example, calcium hydroxide, barium hydroxide, magnesium hydroxide, strontium hydroxide, calcium hydrogen carbonate, barium hydrogen carbonate, magnesium hydrogen carbonate, strontium hydrogen carbonate, carbonic acid calcium (calcium carbonate), carbonic acid barium (barium carbonate), carbonic acid magnesium (magnesium carbonate), carbonic acid strontium (strontium carbonate), calcium acetic acid (calcium acetate), acetic acid barium (barium acetate), acetic acid magnesium (magnesium acetate), strontium acetic acid (strontium acetate), nitric acid calcium (calcium nitrate), nitric acid barium (barium nitrate), nitric acid magnesium (magnesium nitrate), nitric acid strontium (strontium nitrate), nitrous acid calcium (calcium nitrite), nitrous acid barium (barium nitrite), nitrous acid magnesium (magnesium nitrite), nitrous acid strontium (strontium nitrite), nitrous acid calcium (calcium nitrite), nitrous acid barium (barium nitrite), sulfurous acid calcium (calcium sulfite), sulfurous acid barium (barium sulfite), sulfurous acid magnesium (magnesium sulfite), sulfurous acid strontium (strontium sulfite), cyanic acid calcium (calcium cyanate), cyanic acid barium (barium cyanate), cyanic acid magnesium (magnesium cyanate), thiocyanic acid calcium (calcium thiocyanate), thiocyanic acid barium (barium thiocyanate), thiocyanic acid magnesium (magnesium thiocyanate), thiocyanic acid strontium (strontium thiocyanate), styrinic acid calcium (calcium styrinate), styrinic acid barium (barium styrinate), styrinic acid magnesium (magnesium styrinate), and styrinic acid strontium (strontium styrinate) can be given.

Concentration of the Branch-Inducing Catalyst: Typically, the branch-inducing catalysts are added in an amount of $1 \times 10^{-4}$ to $1 \times 10^{-3}$ mole (with respect to 1 mole bisphenol monomer) to the polycarbonate oligomer. The branch-inducing catalysts may also be added in ranges of $1 \times 10^{-7}$ to $1 \times 10^{-6}$, $1 \times 10^{-6}$ to $1 \times 10^{-5}$, $1 \times 10^{-5}$ to $1 \times 10^{-4}$, and $2 \times 10^{-5}$ to $6 \times 10^{-3}$ mole (with respect to 1 mole bisphenol monomer) to the polycarbonate oligomer. Applicants have found that a catalyst concentration that is below a certain level will not induce significant branching, whereas a catalyst concentration that is above a certain level will cause too much branching. It will be appreciated that the effective lower and upper concentration levels of a given catalyst composition will depend on how active and/or selective the catalysts are. In general, the properties of the branched polycarbonate composition, such as the amount of branched Fries products, the polydispersity, and the melt index ratio, increase with increasing catalyst concentration. Preferably, the chlorine content in the branch-inducing catalysts is 20 ppm or below.

Addition of the Branch-Inducing Catalyst to the Process: The branch-inducing catalysts are added to the polycarbonate in a reactor system of the continuous or semi-continuous type. Typically, a continuous or semi-continuous type reactor system is used that consists of two or more reactors in series.

The branch-inducing catalysts are added to the melt polycarbonate oligomer at any stage of the melt process after which the polycarbonate oligomer has reached a weight average molecular weight (Mw) of at least 3,000 g/mole. The branch-inducing catalysts may be added in the oligomerization section: before the CSTR; after the initial CSTR; and/or after the last CSTR; and/or directly into one or more of the CSTR's. The branch-inducing catalysts may be added in the polymerization section or finishing section: before, after or between the polymerizers and/or directly into one or more of the polymerizers. The branch-inducing catalysts may be added to polycarbonate oligomer in an extruder. Also, the branch-inducing catalysts may be added just after the production line splits into two or more polymerization or finishing lines. The branch-inducing catalysts may be added together or separately in any combination of the stages where the polycarbonate oligomer has reached an Mw of at least 3,000 g/mole, more preferably 5,000 g/mole, and most preferably 6,000 g/mole.

Applicants have found that adding the catalyst at an intermediate stage of polymerization is critical. If the branch-inducing catalysts are added after the molecular weight of the oligomers is too high, not as much Fries products are generated, and the Fries products that are generated are more linear or not as effectively branched. A possible explanation is that the mobility of the larger oligomers is too low or possibly the concentration of reactive free OH (endcap level) is too low for high activity. If the branch-inducing catalysts are added too early, branches on branches are generated on the smaller oligomers producing insoluble and unmeltable gels. These gels are difficult to filter out with the melt filter systems after polymerization, and they can clog filters, thus adding to the manufacturing variable costs due to the need to replace filters more often. Also, these gels often become discolored fine particles which degrade the optical properties of the resin. In addition, in some reactor designs it is difficult to stir and pump if the viscosity becomes too high early in the process.

Applicants have found that the addition of branch-inducing catalysts to a polycarbonate oligomer having a molecular weight of greater than 30,000 g/mole provides little further increase in branched Fries products and melt strength. Applicants have found that it is more preferable to add the branch-inducing catalysts to a polycarbonate oligomer having a molecular weight of at least 5,000 g/mole and less than about 20,000 g/mole. Applicants have found that it is most preferable to add the branch-inducing catalysts to a polycarbonate oligomer having a molecular weight of at least 6,000 g/mole and less than about 15,000 g/mole.

The branch-inducing catalysts may be added by means of a static mixer to a melt reaction system. It is preferable to add the branch-inducing catalysts to a polycarbonate oligomer having a content of Fries branch point structures of less than 500 ppm. If the content of Fries branch point structures in the oligomer is too high, then the chain lengths between branch points in the final resin will be short. This can give rise to insoluble gel particles which clog filters and produce poor optical properties in the product.

The Branched Polycarbonate Composition: The addition of the branch-inducing catalysts to the polycarbonate oligomers of a specific size range (namely, a weight average molecular weight of between 3,000 and 30,000 g/mole) in a melt polycondensation process produces a unique branched polycarbonate composition containing a particular range of chain lengths between branching points, a particular percentage range of branched Fries products, a relatively low amount of secondary Fries products, and having improved melt strengths and optical properties. Reaction parameters such as the reaction time and temperature, the types and concentrations of catalysts used, and the timing of the addition of the catalysts were adjusted to maximize the desired properties of the final resin, thus producing a composition that is especially useful for forming bottles and sheets. Applicants have found that by adding branch-inducing catalysts to the already-formed polycarbonate oligomer, which is suitable for the production of general purpose linear polycarbonate, a unique branched polycarbonate composition with a controlled build-up of the melt strength can be produced instead. It is believed that the addition of the branch-inducing catalysts at the later stages of the process produces a branched polycarbonate composition having longer chain lengths between the branching points and containing less insoluble and unmeltable gels in the resin product.

This branched polycarbonate composition can be defined as a mixture comprising linear polycarbonates and Fries products having the general formulas of A, B, and C as shown above. A simplified structure is shown below:

starting segment    branch segment wherein R is OH or a polycarbonate chain, and wherein the starting segment, considered alone, has an Mw of 3,000 to 30,000 g/mole. The addition of the branch-inducing catalysts to the polycarbonate oligomers of a specific size range (namely, a weight average molecular weight of between 3,000 and 30,000 g/mole) in a melt polycondensation process produces a unique branched polycarbonate composition containing 40% or more of branched Fries products compared to total Fries products, preferably 60% or more branched Fries product to total Fries products, even more preferably 80% or more branched Fries product to total Fries products, less than 2,000 ppm of any individual secondary Fries product (for example, for xanthone less than 1000 ppm, more preferably less than 750 ppm, most preferably less than 500 ppm and for hydroxy benzophenone carbonate less than 2000 ppm, more preferably less than 1000 ppm, most preferably less than 500 ppm), and having improved melt strengths and optical properties compared to the polycarbonate oligomers.

Applicants have noted the following trends in product properties when adjusting the reaction parameters: an increase in reaction temperature leads to increases in Fries products, polydispersity (Pd), and melt index ratio (MIR); an increase in branch-inducing catalyst concentration leads to increases in Fries products, Pd, and MIR; and an increase in reaction time leads to increases in Fries products, Pd, and MIR. Applicants have found a fairly linear correlation between total Fries products and MIR over the range of 1,500 to 5,000 ppm Fries and MIR with Pd over the range of Pd=2.4 to 2.9.

Using prior art methods, such as adding a large amount of sodium to the monomer mix or heating the polycarbonate for extended periods of time at high temperatures, one may be able to produce some branched Fries products, however, the reactions also tend to form compositions containing highly polydisperse materials and gels having too high of Mw and melt viscosity for stirrers to handle, and a reduced flexibility in using the polymerization train, and discoloration due to other side products, such as secondary Fries structures.

Content of Branched Fries Products: The method of producing branched polycarbonate as described above produces a composition having branched and unbranched products. The composition contains a certain percentage of branched Fries products, which can be calculated by measuring the total Fries product content on a mass percentage basis of the polycarbonate by hydrolysis to yield monomer units followed by methanolysis of all Fries containing units and subsequent HPLC measurement of these methyl esters of Fries products. The mole ratio of branched to unbranched (or linear Fries) is measured by NMR. The content of branched Fries products is thus the total Fries products multiplied by the mole fraction of branched to total Fries products.

In one composition, the content of branched Fries products in the branched polycarbonate resin is more than 2,000 ppm. In another composition, the content of branched Fries products in the branched polycarbonate resin is more than 3,000 ppm. In another composition, the content of branched Fries products in the branched polycarbonate resin is more than 4,000 ppm. In another composition, the content of branched Fries products in the branched polycarbonate resin is more than 5,000 ppm. In a preferred composition, the content of branched Fries products in the branched polycarbonate resin is from 2,500 ppm to 3,500 ppm.

Molecular weight of the final resin: In one product, the Mw of the branched polycarbonate resin is at least 24,000 g/mole. The Mw of the branched polycarbonate resin ranges from 20,000 to 50,000 g/mole. Preferably, the Mw of the branched polycarbonate resin ranges from 25,000 to 40,000 g/mole. More preferably, the Mw of the branched polycarbonate resin ranges from 27,500 to 37,500 g/mole. If the Mw is too low, the branched polycarbonate resin does not have enough melt viscosity or strength and has poor ductility. If the Mw is too high, the branched polycarbonate resin is too viscous for plant processing (stirring, pumping, filtering, etc.) and for final resin customers to work and form into shapes.

Melt strength, melt viscosity, and polydispersity of the final resin: For blow-mouldable resins and sheet applications it is desired to increase the melt strength of the final resin. The melt strength is a measure of the complex rheological properties of the polymer and can be expressed by the Melt Index Ratio (MIR). MIR is the ratio of the Melt Volume Ratio (MVR) measured with a weight of 2.16 kg and the MVR measured with a weight of 21.6 kg. This complex rheology results from branching in the polycarbonate. Branched polycarbonates are known to have a higher melt strength than linear polycarbonates.

In one aspect of the invention, the MIR value of the branched polycarbonate resin is increased by at least 0.2 relative to that of the polycarbonate oligomer to which the branching agent is added. In another aspect, the MIR of the branched polycarbonate resin is increased by at least 0.1 relative to the MIR of the polycarbonate oligomer reacted under the same conditions, but without the addition of the branch-inducing catalysts. In another aspect, the MIR of the branched polycarbonate resin, measured at a temperature of 280° C., is between approximately 1.5 and 4. In another aspect, the MIR of the branched polycarbonate resin, measured at a temperature of 280° C., is between approximately 1.6 and 3. In another aspect, the MIR of the branched polycarbonate resin, measured at a temperature of 280° C., is between approximately 1.7 and 2.8. In another aspect, the MIR of the branched polycarbonate resin, measured at a temperature of 280° C., is between approximately 1.8 and 2.6. In another aspect, the MIR of the branched polycarbonate resin, measured at a temperature of 300° C., is between approximately 1.5 and 4. In another aspect, the MIR of the branched polycarbonate resin, measured at a temperature of 300° C., is between approximately 1.6 and 3. In another aspect, the MIR of the branched polycarbonate resin, measured at a temperature of 300° C., is between approximately 1.7 and 2.8. In another aspect, the MIR of the branched polycarbonate resin is between approximately 1.8 and 2.6. Preferably, the MIR of the branched polycarbonate resin is between approximately 1.75 and 3.0, and more preferably the MIR is between 1.9 and 2.4.

The polydispersity of a resin describes the resin's consistence of a large number of similar chemical species with different molar masses. Polydispersity may also be due to branching and will be affected by the number, position and length of the side chains. Polydispersity affects the thermodynamic properties of the resin and can be described by the molar mass distribution density function obtained by fractionation or gel-permeation chromatography. Polydispersity (Pd) is calculated by dividing the weight average molecular weight (Mw) by the number average molecular weight (Mn).

In one example of the invention, the polydispersity of the branched polycarbonate resin is between about 2.4 and 3.3. In another example, the polydispersity of the branched polycarbonate resin is between about 2.7 and 3.1. In another example, the polydispersity of the branched polycarbonate resin is greater by at least 0.1 units compared to the polydispersity of a polycarbonate to which no branch-inducing catalyst was added. In another example, the polydispersity of the branched polycarbonate resin is greater by at least 0.9 units compared to the polycarbonate oligomer before the branch-inducing catalyst is added. The polydispersity of the branched polycarbonate resin ranges between about 2.0 to 4.0, but a preferable range is from 2.4 to 3.4, and a more preferable range is 2.8 to 3.2. A higher Pd correlates with a high melt strength.

Applications of the invention: The branched polycarbonate composition obtained by the method as described above can be used to form shaped articles. It can be used in blow molding processes like extrusion blow molding or injection stretch blow molding for the production of hollow products like bottles. Also, it can be used in extrusion processes for the production of profiles, solid sheets, multi-wall sheets and corrugated sheets.

Blow molded and extruded articles can be prepared using various weight percentages of the branched polycarbonate composition. For example, a blow molded or extruded article comprising about 0.1 to 99.9% by weight of the branched polycarbonate composition may be prepared; a blow molded or extruded article comprising about 10 to 75% by weight of the branched polycarbonate composition may also be prepared; and a blow molded or extruded article comprising about 20 to 60% by weight of the branched polycarbonate composition may be prepared. It will be appreciated that other ranges for the weight percentage of the branched polycarbonate composition may also be used to prepare blow molded or extruded articles.

Optional Additions to the Melt Process: It will be appreciated that the invention is usable with many variations known in the art.

Optional Transesterification Catalysts: Various combinations and concentrations of transesterification catalysts can be introduced in the melt polycondensation process. In one example, the amount of transesterification catalyst for the transesterification reaction to form the polycarbonate is $1.0 \times 10^{-6}$ to $1.0 \times 10^{-3}$ chemical equivalents of one or more organic compound and $5.0 \times 10^{-8}$ to $5.0 \times 10^{-6}$ chemical equivalents of one or more inorganic compounds, like an alkali metal or an alkaline earth metal compound, relative to the amount of the aromatic dihydroxy compound.

Non-limiting examples include alkali metals and alkaline earth metals alone or as oxides, hydroxides, amide compounds, alcoholates, and phenolates, basic metal oxides such as ZnO, PbO, and $Sb_2O_3$, organotitanium compounds, soluble manganese compounds, nitrogen-containing basic compounds and acetates of calcium, magnesium, zinc, lead, tin, manganese, cadmium, and cobalt, and compound catalyst systems such as a nitrogen-containing basic compound and a boron compound, a nitrogen-containing basic compound and an alkali (alkaline earth) metal compound, and a nitrogen-containing basic compound, an alkali (alkaline earth) metal compound, and a boron compound.

In one case, the transesterification catalyst used is a quaternary ammonium compound or a quaternary phosphonium compound. Non-limiting examples of these compounds include tetramethylammonium hydroxide, tetramethylammonium acetate, tetramethylammonium fluoride, tetramethylammonium tetraphenylborate, tetraphenylphosphonium fluoride, tetraphenylphosphonium tetraphenylborate, tetrabutylphosphonium hydroxide, tetrabutylphosphonium acetate and dimethyl diphenylammonium hydroxide.

In another case, the organic catalyst is selected from the group consisting of tetramethylammonium hydroxide, tetrabutylphosphonium hydroxide, tetrabutylphosphonium acetate and tert-octyl-imino-tris(dim-ethylamino)-phosphorane. In another case, the inorganic catalyst is selected from the group consisting of NaOH, $Na_2Mg \cdot EDTA$, $NaCsSO_4$, $NaB_4O_7 \cdot EDTA$, $NaGeO_3$, $CsCH_3SO_3$, $Na_3F_6Al$, $CsH_2PO_4$ and $Na_2F_6Ge$.

The catalysts may each be used alone or in combination depending on the intended use. When more than one catalyst is employed, each may be incorporated into the melt at a different stage of the reaction. Part or all of one catalyst may be added together with the polymerization promoter.

The appropriate level of catalyst will depend in part on how many catalysts are being employed. In general, the total amount of catalyst is usually in the range of about $1 \times 10^{-8}$ to about 1.0 mole per mole of the dihydroxy compound. In one example, the level is in the range of about $1 \times 10^{-5}$ to about $5 \times 10^{-2}$ mole per mole of dihydroxy compound. When more than one catalyst is employed, each may be incorporated into the melt at a different stage of the reaction, or they may be incorporated in any combination in the various stages.

Terminators/Endcapping Agents. Terminators or endcapping agents may also be used in the manufacture of the branched polycarbonate composition. Some non-limiting examples of terminators include phenol, p-tert-butylphenol, p-cumylphenol, octylphenol, nonylphenol and other endcapping agents that are well-known in the art.

Optional Branching Agents. Branching agents of the prior art may also be used in addition to the branch-inducing catalysts. Branching agents are well-known and may comprise polyfunctional organic compounds containing three or more functional groups, which may be hydroxyl, carboxyl, carboxylic anhydride, and mixtures thereof. Some non-limiting examples include tris-p-hydroxyphenylethane, isatin-bis-phenol, pentaerythritol, 4,6-dimethyl-2,4,6-tri-(4-hydroxyphenyl)-2-heptene, 4,4'-[1-[4-[1-(4-hydroxyphenyl)-1-methylethyl]phenyl]ethylidine] bisphenol, 2,6-bis[(2-hydroxy-5-methylphenyl)methyl]-4-methylphenol, trimesic acid and benzophenone tetracarboxylic acid.

Optional Coupling Agents. In order to obtain a faster and/or greater build in molecular weight of the polycarbonate oligomer, a coupling agent such as a bis-alkylsalicyl carbonate can be added to the oligomer. Some non-limiting examples include bis-methyl or ethyl or propylsalicyl carbonate, bis-phenyl or benzylsalicyl carbonate, bis(2-benzoylphenyl) carbonate, BPA-bis-2-alkoxyphenylcarbonate, BPA-bis-2-aryloxyphenylcarbonate, and BPA-bis-2-benzoylphenylcarbonate.

Optional Catalyst Neutralizing Agents: The branched polycarbonate resin can be deactivated by a catalyst deactivation or neutralizing agent after the branching reaction is completed. The catalyst neutralizing agent comprises a sulfonic acid ester having the general formula:

$$R_1SO_3R_2$$

wherein $R_1$ is hydrogen, $C_1$–$C_{12}$ alkyl, $C_1$–$C_{12}$ aryl, or $C_1$–$C_{18}$alkylaryl; and $R_2$ is $C_1$–$C_{12}$ alkyl, $C_1$–$C_{12}$ aryl, or $C_1$–$C_{18}$ alkylaryl. In a preferred embodiment, the catalyst neutralizing agent is an alkyltosylate. More preferably, the catalyst neutralizing agent is butyltosylate. The appropriate level of catalyst neutralizing agent will depend in part on the concentration of the catalyst that is being employed. In general, the total amount of catalyst is usually in the range of 1 to 50 ppm, with respect to the polymer material.

Optional Components in the Final Resin: In the present invention, the final resin may further contain any, none, or all of the following: a heat stabilizer, an ultraviolet absorbent, a mould releasing agent, a colorant, an anti-static agent, a lubricant, an anti-fogging agent, a natural oil, a synthetic oil, a wax, an organic filler and an inorganic filler, which are generally described in the prior art.

EXAMPLES

The present invention will be explained hereinafter with reference to the following non-limiting examples. Common to all of the examples, the following measurements were made: Molecular weight: Molecular weight (Mw) and Molecular number (Mn) were measured by GPC analysis of 1 mg/ml polymer solutions in methylene chloride versus polystyrene standards and corrected for polycarbonate.

MVR ($cm^3$/10 minutes) is measured complying with the ISO 1133 norms at a temperature of typically 280° C. and at a load of 2.16 kg or 21.6 kg.

MIR is a measure for the melt strength of the polymer. It is calculated with the following formula: MIR=(MVR 21.6 kg/MVR 2.16 kg)/10 Fries component (ppm): The amount of Fries component is measured by HPLC by hydrolysis and methanolysis of the polycarbonate and by detecting the Fries component with an UV detector at a wavelength of 310 nm.

The "Branching" experiments described below are performed using the three different types of polycarbonate (referred to as A, B, and C) made in a continuous melt process. The properties of these materials are shown in Table 1. Polycarbonate types A and B are produced by using low Fries generating catalyst systems. The systems consist of using tetrabutylphosphonium acetate ($150 \times 10^{-6}$ mole/mole dihydroxy compound) and sodium hydroxide ($0.57 \times 10^{-6}$ mole/mole dihydroxy compound) and typically result in a polycarbonate having a low concentration of Fries branched structures.

Example 1

A batch reactor tube [was charged with 50 g of polycarbonate A and $2.5 \times 10^{-6}$ mole of NaOH with respect to 1 mole bisphenolacetone under nitrogen. The mixture was heated to a temperature of 310° C. and stirred for 20 minutes. After the melt mixing stage, a vacuum was applied to the system to a pressure of 0.5 mbar, and the reaction was continued for 30 minutes. After 30 minutes, the pressure was increased to atmospheric pressure and 13.5 ppm of butyltosylate (with respect to the polymer material) was added to the melt and stirred for an additional 5 minutes. After the reaction, the polymer was sampled from the reaction tube. As summarized in Table 2, the MIR was increased from 1.1 to 2.0.

Example 2

A batch reactor tube was charged with 50 g of polycarbonate A and $7.5 \times 10^{-6}$ mole of NaOH with respect to 1 mole bisphenolacetone under nitrogen. The mixture was heated to a temperature of 310° C. and stirred for 20 minutes. After the melt mixing stage, a vacuum was applied to the system to a pressure of 0.5 mbar, and the reaction was continued for 30 minutes. After 30 minutes, the pressure was increased to atmospheric pressure and 40.5 ppm of butyltosylate (with respect to the polymer material) was added to the melt and stirred for an additional 5 minutes. After the reaction, the polymer was sampled from the reaction tube. As summarized in Table 2, the MIR was increased from 1.1 to 3.7.

Example 3

Example 2 was repeated but instead of using sodium hydroxide, $7.5 \times 10^{-6}$ mole of sebaccic acid disodium salt (D), with respect to 1 mole bisphenolacetone was added to the polymer. As summarized in Table 2, the MIR is increased from 1.1 to 2.8.

(D)

Example 4

Example 2 was repeated but instead of using sodium hydroxide, $7.5 \times 10^{-6}$ mole of sodium orthovanadate (E), with respect to 1 mole bisphenolacetone was added to the polymer. The results are summarized in Table 2. Due to the

TABLE 1

Properties of the Different Polycarbonate Types.

| Polycarbonate Type | Mw (g/mol) | Mn (g/mol) | Pd | Fries (ppm) | MVR 4 min, 2.16 kg 280° C. | MVR 4 min. 21.6 Kg 280° C. | MIR |
|---|---|---|---|---|---|---|---|
| A | 8490 | 4409 | 1.9 | 374 | 2.32(1) | 409.15(1) | 1.1 |
| B | 24435 | 10962 | 2.2 | 1104 | 15.66 | 210.28 | 1.3 |
| C | 28848 | 11703 | 2.5 | 2531 | 6.17 | 94.33 | 1.5 |

(1)Measured at 180° C.

high melt viscosity it was not possible to characterize the MIR value.

(E)

Example 5

Example 2 was repeated but instead of using sodium hydroxide, $7.5 \times 10^{-6}$ mole of 1,2-bis(2-aminiphenoxy)-ethane-N,N,N',N'-tetraacetic acid tetracesium salt (F), with respect to 1 mole bisphenolacetone was added to the polymer. A highly branched and/or cross-linked polymer was obtained, and further characterization of this product was not possible due to its limited solubility and high melt viscosity.

(F)

Example 6

A batch reactor tube was charged with 50 g of polycarbonate B and $7.5 \times 10^{-6}$ mole of NaOH with respect to 1 mole bisphenolacetone under nitrogen. The mixture was heated to a temperature of 310° C. and stirred for 20 minutes. After the melt mixing stage, a vacuum was applied to the system to a pressure of 0.5 mbar, and the reaction was continued for 30 minutes. After 30 minutes, the pressure was increased to atmospheric pressure and 40.5 ppm of butyltosylate (with respect to the polymer material) was added to the melt and stirring was continued for 5 minutes. After the reaction, the polymer was sampled from the reaction tube. As summarized in Table 2, the MIR was increased from 1.3 to 1.5.

Example 7

A batch reactor tube was charged with 50 g of polycarbonate C and $7.5 \times 10^{-6}$ mole of NaOH with respect to 1 mole bisphenolacetone under nitrogen. The mixture was heated to a temperature of 310° C. and stirred for 20 minutes. After the melt mixing stage, a vacuum was applied to the system to a pressure of 0.5 mbar, and the reaction was continued for 30 minutes. After 30 minutes, the pressure was increased to atmospheric pressure and 40.5 ppm of butyltosylate (with respect to the polymer material) was added to the melt and stirring was continued for 5 minutes. After the reaction, the polymer was sampled from the reaction tube. As summarized in Table 2, the MIR was increased from 1.5 to 1.7.

Comparative Example 1

A batch reactor tube was charged with 50 g of polycarbonate A under nitrogen, and no catalyst was added. The mixture was heated to a temperature of 310° C. and stirred for 20 minutes. After the melt mixing stage, a vacuum was applied to the system to a pressure of 0.5 mbar, and the reaction was continued for 30 minutes. After 30 minutes, the pressure was increased to atmospheric pressure and 13.5 ppm of butyltosylate (with respect to the polymer material) was added to the melt and stirring was continued for 5 minutes. After the reaction, the polymer was sampled from the reaction tube. The results are summarized in Table 2.

Comparative Example 2

A batch reactor tube was charged with 50 g of polycarbonate B under nitrogen, and no catalyst was added. The mixture was heated to a temperature of 310° C. and stirred for 20 minutes. After the melt mixing stage, a vacuum was applied to the system to a pressure of 0.5 mbar, and the reaction was continued for 30 minutes. After 30 minutes, the pressure was increased to atmospheric pressure and 13.5 ppm of butyltosylate (with respect to the polymer material) was added to the melt and stirring was continued for 5 minutes. After the reaction, the polymer was sampled from the reaction tube. The results are summarized in Table 2.

Comparative Example 3

A batch reactor tube was charged with 50 g of polybonate C under nitrogen, and no catalyst was added. The mixture was heated to a temperature of 310° C. and stirred for 20 minutes. After the melt mixing stage, a vacuum was applied to the system to a pressure of 0.5 mbar, and the reaction was continued for 30 minutes. After 30 minutes, the pressure was increased to atmospheric pressure and 13.5 ppm of butyltosylate (with respect to the polymer material) was added to the melt and stirring was continued for 5 minutes. After the reaction, the polymer was sampled from the reaction tube. The results are summarized in Table 2.

[t2]

TABLE 2

Data for the Examples and the Comparative Examples.

| | PC type | Added components (with respect to 1 mole dihydroxy compound) | Mw (g/mole) | Mn (g/mole) | Pd | Fries (ppm) | MVR 4 min, 2.16 kg 280 deg. | MVR 4 min, 21.6 kg 280 deg. | MIR |
|---|---|---|---|---|---|---|---|---|---|
| Example 1 | A | $2.5 \times 10^{-6}$ mole NaOH | 37212 | 13516 | 2.8 | 5428 | 1.95 | 38.95 | 2.0 |
| Example 2 | A | $7.5 \times 10^{-6}$ mole NaOH | 42544 | 13655 | 3.1 | 7212 | 0.54 | 20.07 | 3.7 |
| Example 3 | A | $7.5 \times 10^{-6}$ mole Sebaccic acid | 39565 | 12781 | 3.1 | 6528 | 1.11 | 31.02 | 2.8 |
| Example 4 | A | $7.5 \times 10^{-6}$ mole $Na_3VO_4$ | 51279 | 17157 | 3.0 | 11983 | NM | NM | NM |

TABLE 2-continued

Data for the Examples and the Comparative Examples.

| | PC type | Added components (with respect to 1 mole dihydroxy compound) | Mw (g/mole) | Mn (g/mole) | Pd | Fries (ppm) | MVR 4 min, 2.16 kg 280 deg. | MVR 4 min, 21.6 kg 280 deg. | MIR |
|---|---|---|---|---|---|---|---|---|---|
| Example 5 | A | 7.5 × 10⁻⁶ mole BAPTAC | NM | NM | NM | NM | NM | NM | NM |
| Example 6 | B | 7.5 × 10⁻⁶ mole NaOH | 26223 | 10980 | 2.4 | 1665 | 11.17 | 164.84 | 1.5 |
| Example 7 | C | 7.5 × 10⁻⁶ mole NaOH | 27940 | 10924 | 2.6 | 3696 | 6.76 | 113.2 | 1.7 |
| Comparative example 1 | A | — | 27896 | 11007 | 2.5 | 3809 | 7.94 | 130.43 | 1.6 |
| Comparative example 2 | B | — | 25173 | 10612 | 2.4 | 1367 | 14.47 | 202.7 | 1.4 |
| Comparative example 3 | C | — | 28768 | 11720 | 2.5 | 3328 | 7.02 | 106.71 | 1.5 |

NM = Not Measured

What is claimed is:

1. A method for preparing a branched polycarbonate composition, comprising the step of adding one or more branch-inducing catalysts, together or separately, to a polycarbonate oligomer during one or more stages of a melt polycondensation process for producing polycarbonates after which the polycarbonate oligomer has reached a weight average molecular weight (Mw) of at least 3,000 g/mole to form a branched polycarbonate composition wherein the branch-inducing catalysts are included in an amount sufficient to increase the melt strength of the branched polycarbonate composition relative to a composition produced from the polycarbonate oligomers without addition of the branch-inducing catalysts.

2. The method of claim 1, wherein the branch-inducing catalysts are alkali metal compounds.

3. The method of claim 2, wherein the alkali metal compounds are selected from the group consisting of hydroxides of the alkali metals, hydrocarbons of the alkali metals, carbonate salts of the alkali metals, acetic acid salts (acetates) of the alkali metals, aliphatic acid salts of the alkali metals, aromatic acid salts of the alkali metals, nitric acid salts (nitrates) of the alkali metals, nitrous acid salts (nitrites) of the alkali metals, sulfurous acid salts (sulfites) of the alkali metals, cyanic acid salts (cyanates) of the alkali metals, thiocyanic acid salts (thiocyanates) of the alkali metals, styrinic acid salts (styrinates) of the alkali metals, boron hydrogen salts (borohydrides) of the alkali metals, benzoic acid salts (benzoates) of the alkali metals, phosphoric acid hydrogen salts (hydrogenphosphates) of the alkali metals, vanadium oxoanion salts of the alkali metals, bisphenol salts of the alkali metals, and phenol salts of the alkali metals, or combinations thereof.

4. The method of claim 2, wherein the alkali metal compounds are selected from the group consisting of sodium hydroxide, potassium hydroxide, lithium hydroxide, sodium hydrogen carbonate, potassium hydrogen carbonate, lithium hydrogen carbonate, carbonic acid sodium (sodium carbonate), carbonic acid potassium (potassium carbonate), carbonic acid lithium (lithium carbonate), sebaccic acid disodium salt, 2,2"-biquinoline-4,4"dicarboxylic acid disodium salt, 1,2-bis(2-aminiphenoxy)-ethane-N,N,N',N'-tetra acetic acid tetracesium salt, nitric acid sodium (sodium nitrate), nitric acid potassium (potassium nitrate), nitric acid lithium (lithium nitrate), nitrous acid sodium (sodium nitrite), nitrous acid potassium (potassium nitrite), nitrous acid lithium (lithium nitrite), cyanic acid sodium (sodium cyanate), cyanic acid potassium (potassium cyanate), cyanic acid lithium (lithium cyanate), thiocyanic acid sodium (sodium thiocyanate), thiocyanic acid potassium (potassium thiocyanate), thiocyanic acid lithium (lithium thiocyanate), styrinic acid sodium (sodium styrinate), styrinic acid potassium (potassium styrinate), styrinic acid lithium (lithium styrinate), hydrogenated boron sodium (sodium hydroboron), hydrogenated boron potassium (potassium hydroboron), hydrogenated boron lithium (lithium hydroboron), phenylated boron sodium (sodium phenylboron), benzoic acid sodium (sodium benzoate), benzoic acid potassium (potassium benzoate), benzoic acid lithium (lithium benzoate), phosphoric acid hydrogen disodium (disodium hydrogen phosphate), phosphoric acid hydrogen dipotassium (dipotassium hydrogen phosphate), phosphoric acid hydrogen dilithium (dilithium hydrogen phosphate), sodium orthovanadate, disodium salt of Bisphenol A, dipotassium salt of Bisphenol A, dilithium salt of Bisphenol A, sodium salt of phenol, potassium salt of phenol, and lithium salt of phenol, or combinations thereof.

5. The method of claim 1, wherein the branch-inducing catalysts are alkali metal salts.

6. The method of claim 1, wherein the branch-inducing catalysts are alkaline earth metal compounds.

7. The method of claim 6, wherein the alkaline earth metal compounds are selected from the group consisting of hydroxides of the alkaline earth metals, hydrocarbons of the alkaline earth metals, carbonate salts of the alkaline earth metals, acetic acid salts (acetates) of the alkaline earth metals, nitric acid salts (nitrates) of the alkaline earth metals, nitrous acid salts (nitrites) of the alkaline earth metals, sulfurous acid salts (sulfites) of the alkaline earth metals, cyanic acid salts (cyanates) of the alkaline earth metals, thiocyanic acid salts (thiocyanates) of the alkaline earth metals, styrinic acid salts (styrinates) of the alkaline earth metals, boron hydrogen salts (borohydrides) of the alkaline earth metals, benzoic acid salts (benzoates) of the alkaline earth metals, phosphoric acid hydrogen salts (hydrogen phosphates) of the alkaline earth metals, bisphenol salts of the alkaline earth metals, and phenol salts of the alkaline earth metals, or combinations thereof.

8. The method of claim 6, wherein the alkaline earth metal compounds are selected from the group consisting of calcium hydroxide, barium hydroxide, magnesium hydroxide, strontium hydroxide, calcium hydrogen carbonate, barium hydrogen carbonate, magnesium hydrogen carbonate, strontium hydrogen carbonate, carbonic acid calcium (calcium carbonate), carbonic acid barium (barium carbonate), carbonic acid magnesium (magnesium carbonate), carbonic acid strontium (strontium carbonate), calcium acetic acid (calcium acetate), acetic acid barium (barium acetate), acetic acid magnesium (magnesium acetate), strontium acetic acid (strontium acetate), nitric acid calcium (calcium nitrate), nitric acid barium (barium nitrate), nitric acid magnesium (magnesium nitrate), nitric acid strontium (strontium nitrate), nitrous acid calcium (calcium nitrite), nitrous acid barium (barium nitrite), nitrous acid magnesium (magnesium nitrite), nitrous acid strontium (strontium nitrite), nitrous acid calcium (calcium nitrite), nitrous acid barium (barium nitrite), sulfurous acid calcium (calcium sulfite), sulfurous acid barium (barium sulfite), sulfurous acid magnesium (magnesium sulfite), sulfurous acid strontium (strontium sulfite), cyanic acid calcium (calcium cyanate), cyanic acid barium (barium cyanate), cyanic acid magnesium (magnesium cyanate), thiocyanic acid calcium (calcium thiocyanate), thiocyanic acid barium (barium thiocyanate), thiocyanic acid magnesium (magnesium thiocyanate), thiocyanic acid strontium (strontium thiocyanate), styrinic acid calcium (calcium styrinate), styrinic acid barium (barium styrinate), styrinic acid magnesium (magnesium styrinate), and styrinic acid strontium (strontium styrinate), or combinations thereof.

9. The method of claim 1, wherein the branch-inducing catalysts are alkaline earth metal salts.

10. The method of claim 1, wherein the branch-inducing catalysts are selected from the group consisting of aliphatic acid salts of the alkali metals, aromatic acid salts of the alkali metals, and vanadium oxoanion salts of the alkali metals, or combinations thereof.

11. The method of claim 1, wherein the branch-inducing catalysts are selected from the group consisting of sodium hydroxide, sebaccic acid disodium salt, 1,2-bis(2-aminiphenoxy)-ethane-N,N,N',N'-tetra acetic acid tetracesium salt, and sodium orthovanadate, or combinations thereof.

12. The method of claim 1, wherein the branch-inducing catalyst is sodium hydroxide.

13. The method of claim 1, wherein the branch-inducing catalyst is sebaccic acid disodium salt.

14. The method of claim 1, wherein the branch-inducing catalyst is sodium orthovanadate.

15. The method of claim 1, wherein the branch-inducing catalyst is 2,2'-biquinoline-4,4'dicarboxylic acid disodium salt.

16. The method of claim 1, wherein the branch-inducing catalysts are added in an amount of $1\times10^{-4}$ to $1\times10^{-7}$ mole (with respect to 1 mole bisphenol monomer) to the polycarbonate oligomer.

17. The method of claim 1, wherein the branch-inducing catalysts are added in an amount of $6\times10^{-3}$ to $2\times10^{-5}$ mole (with respect to 1 mole bisphenol monomer) to the polycarbonate oligomer.

18. The method of claim 1, wherein the branch-inducing catalysts are added to the polycarbonate in a reactor system of the continuous or semi-continuous type.

19. The method of claim 18, wherein the reactor system consists of two or more reactors in series.

20. The method of claim 18, wherein the branch-inducing catalysts are added an oligomerizing section.

21. The method of claim 20, wherein the branch-inducing catalysts are added before or directly into an initial CSTR.

22. The method of claim 20, wherein the branch-inducing catalysts are added after an initial CSTR.

23. The method of claim 20, wherein the branch-inducing catalysts are added after a last CSTR.

24. The method of claim 18, wherein the branch-inducing catalysts are added in a polymerizing section.

25. The method of claim 24, wherein the branch-inducing catalysts are added before polymerizers.

26. The method of claim 24, wherein the branch-inducing catalysts are added into one or more polymerizers.

27. The method of claim 24, wherein the branch-inducing catalysts are added between polymerizers.

28. The method of claim 24, wherein the branch-inducing catalysts are added after polymerizer(s).

29. The method of claim 18, wherein the branch-inducing catalysts are added in a finishing section.

30. The method of claim 29, wherein the branch-inducing catalysts are added before a first polymerizer.

31. The method of claim 29, wherein the branch-inducing catalysts are added to one or more polymerizers.

32. The method of claim 29, wherein the branch-inducing catalysts are added after a last polymerizer.

33. The method of claim 18, wherein the branch-inducing catalysts are added in an extruder.

34. The method of claim 18, wherein the branch-inducing catalysts are added to a continuous melt reaction system after a production line splits into two or more polymerization or finishing lines.

35. The method of claim 18, wherein the branch-inducing catalysts are added by means of a static mixer to the reactor system.

36. The method of claim 18, wherein the branch-inducing catalysts are added together or separately into any of the following stages of the melt process:
  in an oligomerization section: before a CSTR; directly into a CSTR; after an initial CSTR; and/or after a last CSTR;
  in a polymerization section or finishing section: before, after or between polymerizers and/or directly into one or more polymerizers;
  in an extruder; and/or
  after a production line splits into two or more polymerization or finishing lines.

37. The method of claim 1, wherein the branch-inducing catalysts are added to a polycarbonate oligomer having a molecular weight (Mw) of no more than about 30,000 g/mole.

38. The method of claim 1, wherein the branch-inducing catalysts are added to a polycarbonate oligomer having a molecular weight (Mw) of at least 5,000 g/mole and up to about 20,000 g/mole.

39. The method of claim 1, wherein the branch-inducing catalysts are added to a polycarbonate oligomer having a molecular weight (Mw) of at least 6,000 g/mole and up to about 15,000 g/mole.

40. The method of claim 1, wherein the reaction conditions were varied, whereby the branched polycarbonate composition has a Melt Index Ratio (MIR) that is greater by at least 0.1 compared to a composition produced from the polycarbonate oligomers without addition of the branch-inducing catalysts.

41. The method of claim 1, wherein the reaction conditions were varied, whereby the branched polycarbonate composition has a Melt Index Ratio (MIR) that is greater by at least 0.2 compared to the MIR of the starting oligomer.

42. The method of claim 1, wherein the reaction conditions were varied, whereby the molecular weight (Mw) of the branched polycarbonate composition is at least 24,000 g/mole.

43. The method of claim 1, wherein the polycarbonate oligomers have Fries branch point structures.

44. The method of claim 43, wherein the branch-inducing catalysts are added to a polycarbonate oligomer having a content of Fries branch point structures of less than 500 ppm.

45. The method of claim 1, wherein the reaction conditions were varied such that the branched polycarbonate composition comprises branched and unbranched structures, and wherein the amount of branched structures is at least 2,000 ppm.

46. The method of claim 45, wherein the reaction conditions were varied such that the amount of branched Fries products of the branched polycarbonate composition is at least 3,000 ppm.

47. The method of claim 45, wherein the reaction conditions were varied such that the amount of branched Fries products of the branched polycarbonate composition is at least 4,000 ppm.

48. The method of claim 45, wherein the reaction conditions were selected such that the amount of branched Fries products of the branched polycarbonate composition is at least 5,000 ppm.

49. The method of claim 45, wherein the reaction conditions were selected such that the amount of branched Fries products in the branched polycarbonate resin is from 2,500 ppm to 3,500 ppm.

50. The method of claim 1, wherein the reaction conditions were selected such that a melt index ratio, measured at a temperature of 280° C., of the branched polycarbonate composition is between 1.5 and 4.

51. The method of claim 1, wherein the reaction conditions were selected such that a melt index ratio, measured at a temperature of 280° C., of the branched polycarbonate composition is between 1.6 and 3.

52. The method of claim 1, wherein the reaction conditions were selected such that a melt index ratio, measured at a temperature of 280° C., of the branched polycarbonate composition is between 1.7 and 2.8.

53. The method of claim 1, wherein the reaction conditions were selected such that a melt index ratio, measured at a temperature of 280° C., of the branched polycarbonate composition is between 1.8 and 2.6.

54. The method of claim 1, wherein the reaction conditions were selected such that a melt index ratio, measured at a temperature of 300° C., of the branched polycarbonate composition is between 1.5 and 4.

55. The method of claim 1, wherein the reaction conditions were selected such that a melt index ratio, measured at a temperature of 300° C., of the branched polycarbonate composition is between 1.6 and 3.

56. The method of claim 1, wherein the reaction conditions were selected such that a melt index ratio, measured at a temperature of 300° C., of the branched polycarbonate composition is between 1.7 and 2.8.

57. The method of claim 1, wherein the reaction conditions were selected such that a melt index ratio, measured at a temperature of 300° C., of the branched polycarbonate composition is between 1.8 and 2.6.

58. The method of claim 1, wherein the reaction conditions were selected such that a melt index ratio, measured at a temperature of 280° C. or 300° C., of the branched polycarbonate composition is between approximately 1.75 and 3.0.

59. The method of claim 1, wherein the reaction conditions were selected such that a melt index ratio, measured at a temperature of 280° C. or 300° C., of the branched polycarbonate composition is between 1.9 and 2.4.

60. The method of claim 1, wherein the reaction conditions were selected such that a polydispersity of the branched polycarbonate composition is between 2.4 and 3.3.

61. The method of claim 1, wherein the reaction conditions were selected such that a polydispersity of the branched polycarbonate composition is between 2.7 and 3.1.

62. The method of claim 1, wherein the reaction conditions were selected such that a polydispersity of the branched polycarbonate composition is between about 2.0 to 4.0.

63. The method of claim 1, wherein the reaction conditions were selected such that a polydispersity of the branched polycarbonate composition is between about 2.8 to 3.2.

64. The method of claim 1, wherein the reaction conditions were selected such that a polydispersity of the branched polycarbonate composition is greater by at least 0.1 units compared to a polydispersity of a composition produced from the polycarbonate oligomers without addition of the branch-inducing catalysts.

65. The method of claim 1, wherein the reaction conditions were selected such that a polydispersity of the branched polycarbonate composition is greater by at least 0.9 units compared to a polydispersity of a composition produced from the polycarbonate oligomers without addition of the branch-inducing catalysts.

66. The method of claim 1, further comprising the step of adding one or more of the following: a heat stabilizer, an ultraviolet absorbent, a mold releasing agent, a colorant, an anti-static agent, a lubricant, an anti-fogging agent, a natural oil, a synthetic oil, a wax, an organic filler and an inorganic filler.

67. The method of claim 1, further comprising the step of adding one or more of the following to the melt polycondensation process: transesterification catalysts, polymerization promoters, terminators, endcapping agents, branching agents, coupling agents, and catalyst neutralizing agents.

68. The method of claim 1, wherein the chlorine content in the branch-inducing catalysts is 20 ppm or below.

69. The method of claim 1, wherein the branched polycarbonate composition is deactivated by a catalyst deactivation agent after the branching reaction is completed.

70. The method of claim 69, wherein the deactivation agent is butyltosylate.

71. A branched polycarbonate composition produced according to the method of claim 1.

72. A composition comprising linear polycarbonates and Fries products of the general formula:

$$-\text{O}-\!\!\left\langle\!\!\!\bigcirc\!\!\!\right\rangle\!\!-\text{X}-\!\!\left\langle\!\!\!\bigcirc\!\!\!\right\rangle\!\!-\text{R}$$

| starting segment | branch segment | wherein R is OH or a polycarbonate chain, and wherein the starting segment, considered alone, has a Mw of 3,000 to 30,000 g/mole.

73. The composition of claim 72, wherein the Fries products comprises 40% or more of branched Fries products and less than 2,000 ppm of any individual secondary Fries product.

74. The composition of claim 72, wherein the MIR of the composition is between approximately 1.5 and 4.0.

75. The composition of claim 72, wherein the MIR of the composition is between approximately 1.75 and 3.0.

76. The composition of claim 72, wherein the MIR of the composition is between 1.9 and 2.4.

77. The composition of claim 72, wherein the polydispersity of the composition ranges between about 2.0 to 4.0.

78. The composition of claim 72, wherein the polydispersity of the composition ranges between about 2.8 to 3.2.

79. The composition of claim 72, wherein the content of branched Fries products in the composition is from 2,500 ppm to 3,500 ppm.

80. The composition of claim 72, wherein the content of branched Fries products in the composition is from 2,000 ppm or more.

81. The composition of claim 72, wherein the Mw of the composition is from 20,000 to 50,000 g/mole.

82. A shaped article formed from the composition of claim 72.

83. The article of claim 82, wherein the article is a blow-molded or extruded article.

84. The article of claim 83, where the article is a profile, solid sheet, multi-wall sheet or corrugated sheet.

85. The article of claim 83, where the article is a hollow product with none or one or more openings.

86. The article of claim 83, wherein the article comprises 0.1 to 99.9% by weight of the branched polycarbonate composition prepared according to the method of claim 1.

87. The article of claim 86, wherein the article comprises 10 to 75% by weight of the branched polycarbonate composition prepared according to the method of claim 1.

88. The article of claim 87, wherein the article comprises 20 to 60% by weight of the branched polycarbonate composition prepared according to the method of claim 1.

89. The article of claim 83, wherein the branched polycarbonate composition is produced according to the method of claim 1 further comprising the step of adding one or more of the following: transesterification catalysts, polymerization promoters, terminators, endcapping agents, branching agents, coupling agents, catalyst neutralizing agents, a heat stabilizer, an ultraviolet absorbent, a mold releasing agent, a colorant, an anti-static agent, a lubricant, an anti-fogging agent, a natural oil, a synthetic oil, a wax, an organic filler and an inorganic filler.

* * * * *